United States Patent [19]

Hansel

[11] 4,388,732
[45] Jun. 14, 1983

[54] FIBER OPTIC DATA LINK
[75] Inventor: Allen B. Hansel, Wayside, N.J.
[73] Assignee: The Perkin-Elmer Corporation, Norwalk, Conn.
[21] Appl. No.: 280,394
[22] Filed: Jul. 6, 1981
[51] Int. Cl.$^3$ ............................................. H04B 9/00
[52] U.S. Cl. ........................... 455/608; 455/612; 455/619; 371/65
[58] Field of Search .............. 455/608, 606, 602, 612, 455/617, 610, 613, 619; 371/65; 370/1, 3

[56] References Cited
FOREIGN PATENT DOCUMENTS
55-107352  8/1980  Japan ..................................... 455/619

Primary Examiner—Marc E. Bookbinder
Assistant Examiner—Edward L. Coles
Attorney, Agent, or Firm—S. A. Giarratana; E. T. Grimes; J. D. Crane

[57] ABSTRACT

A fiber optic data link between two points includes a transmitter which serially encodes data and transmits pulses at one rate if DTR is active at the transmitter and at another rate if it is not active. The receiver separates the pulses from the data and tests the pulse rate to decide if DTR at the transmitter is active or not. If no pulses are received, the receiver indicates the data link is not operational.

8 Claims, 6 Drawing Figures

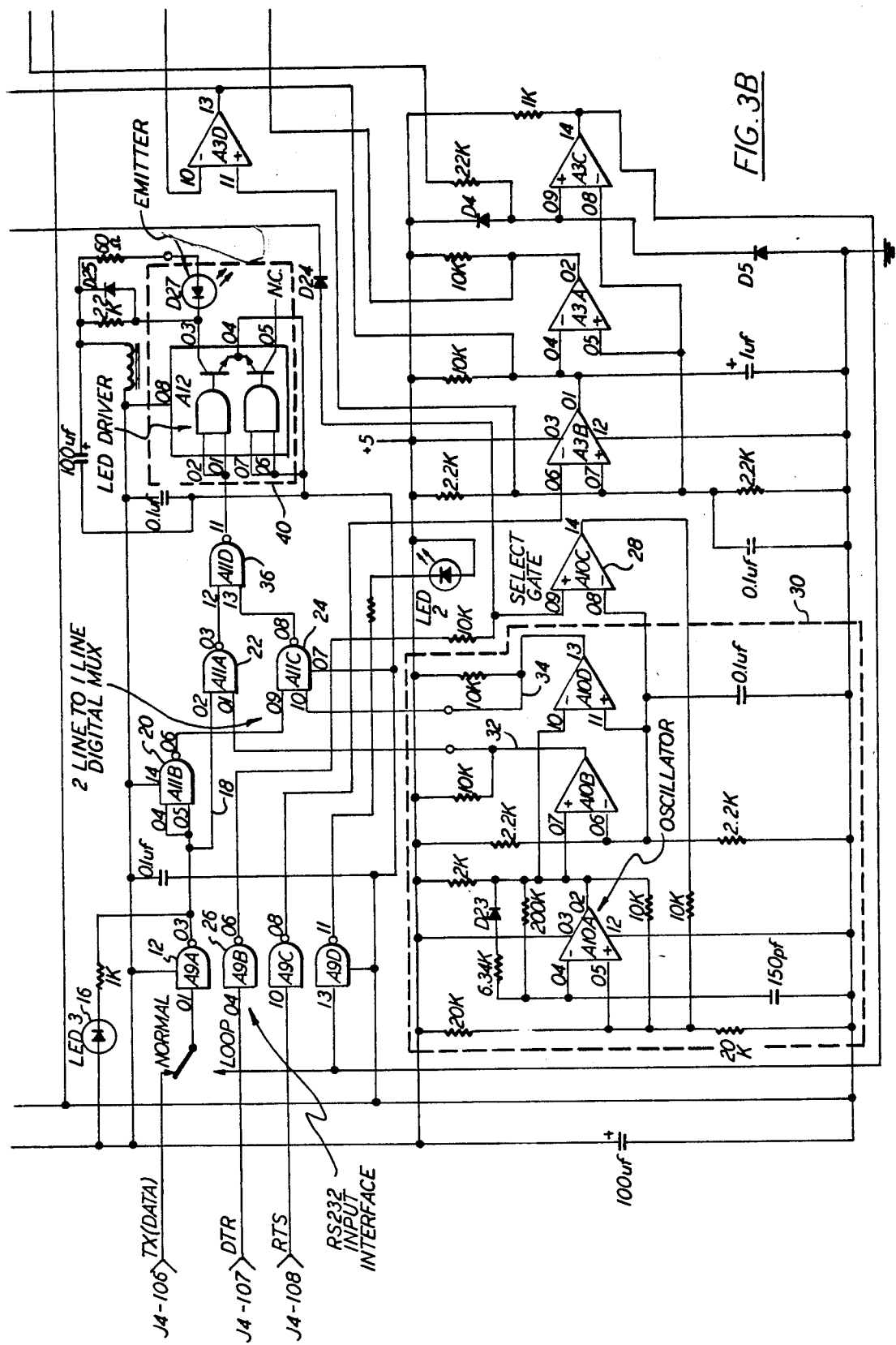

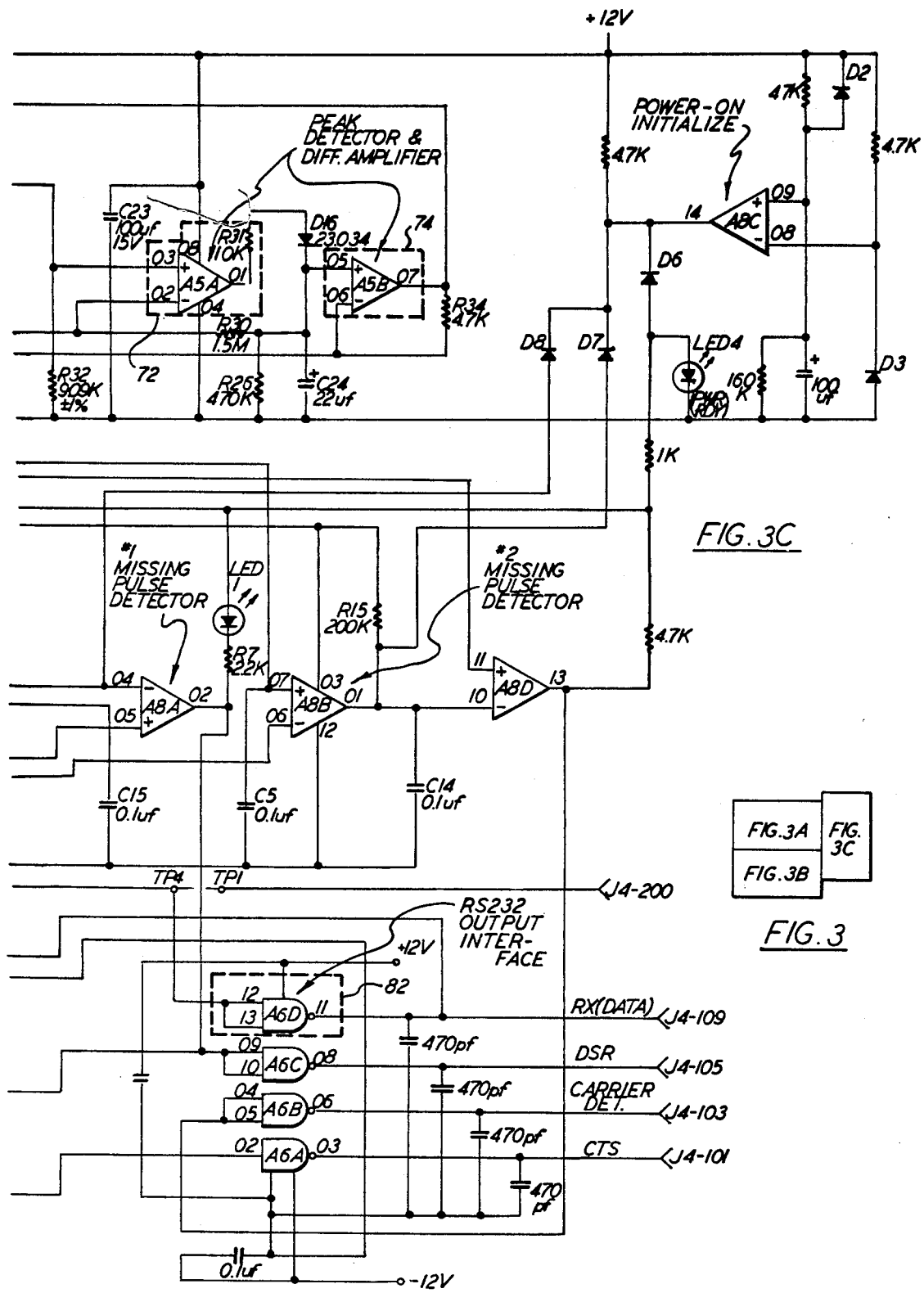

FIBER OPTIC DATA LINK

This invention relates broadly to a data communication link and particularly to a communications link using a fiber optical transmissions media.

In the field of digital communications, many different data transmission techniques have been developed. A well known standard for data transmission is known as RS-232. An RS-232 network requires a plurality of wires each with a known function. As a result of the multiple wires, the cost of these wires in a system of this sort can become expensive.

In addition to wiring cost, use of such multi-wire cables in environments having high radio frequency interference can cause data transmission errors. These errors are mainly caused by spurious pulses being produced in the wires by the rf signal.

In other applications where data must be sent through chemically active substances or environments, use of electrical cable is often difficult because a chemical reaction may cause the wire itself to be destroyed.

Even in situations where wires are not subject to radio frequence interference (RFI) or chemical action, problems may occur due to the fact that the electrical potential of ground may be different at both ends of the data transmission line. This problem becomes especially noticable over distances exceeding about 1 to 2 kilometers. When such electrical ground potential differences occur, expensive receivers are required on opposite ends of the transmission line which can sometimes operate correctly despite the difference in ground voltage at the two locations on opposite ends of the communication wires.

It has also been found that in some environments, a static charge may build up on structures near the communication cable between two devices. The static charge typically builds up until a discharge occurs, which may cause errors on nearby communications wires.

Another problem associated with RS-232 interfaces is the requirement of devices coupled to the interface to know within a short period of time that the Device Terminal Ready signal has changed state. In some applications where a computer is communicating over an RS-232 interface to a remote device, the computer must know that the Data Terminal Ready signal has changed state within the time required to send one byte of data.

In view of the above-mentioned difficulties, one approach to solving these problems is to design a digital interface and to replace the control lines of the RS-232 wire interface with control data transmitted with the information desired to be transmitted. Such an approach requires stable clocks at both ends of the interface which must be at rates quite high compared to the data transmission rate desired because both data and control information must be sent over the interface. The hardware required would have to be complex in order to handle the different data rates available over typical RS-232 interfaces.

In view of these and other difficulties, it is a primary object of the present invention to provide a communication interface that is RS-232 compatible but does not suffer from the above-discussed problems.

It is a more specific objective of the invention to provide an interface between two communication devices which is not susceptible to RFI.

It is another specific object of the invention to provide a communication link between two communications devices which is not affected by chemical action and which would normally destroy communication links using electrical cable.

It is still another specific object of the invention to provide a communications link between two devices which is immune from changes in ground potential at both ends of the link.

It is a further specific object of the invention to provide a communication link between two devices which is immune from error caused by static discharge.

In achieving the foregoing and other objects, advantages and features, the present invention includes at least two optical fibers running between two remotely located devices. A light source and a light sensor are located at opposite ends of each fiber with a sensor and a source located at each of the remotely located devices. The optical fiber is immune to RFI, difference of ground potential and static discharge problems mentioned above. The optical fiber is largely unaffected by chemical environments where wires would soon be destroyed.

The communication link between a sending unit and a receiving unit includes a data transmitter coupled to the light source. The level on the control line is evaluated by the circuitry and pulses are generated at one of two frequencies, depending on the level of the control line. The data and the pulses representing the control line are merged together in a 2 line to 1 line multiplexer. The multiplexer output drives a LED coupled to one optical fiber.

At the other end of the fiber, a photodetector responds to the light produced at the transmitter. The photodetector output is normalized and coupled to a low pass filter to remove the data from the normalized signal. The data is then transmitted over a wire to the receiving device.

The normalized data also couples to a high pass filter which passes the pulses representing the control line. The high pass filter couples to a first missing pulse detector which detects when pulses occur at a rate slower than the higher of the two pulse frequencies. When this occurs, the state of a control line to the receiving unit changes to an inactive state.

The high pass filter couples to a second missing pulse detector which changes output state when the pulses received thereby are at a frequency lower than the lower of the two pulse frequencies. This state change indicates that the data link is not operational.

BRIEF DESCRIPTION OF THE DRAWINGS

The foregoing and other objects, advantages and features of the present invention are described below in greater detail in connection with the drawings wherein:

FIG. 3 illustrates the manner in which FIGS. 3A–3C fit together to form a detailed circuit diagram;

FIGS. 3A–3C comprise a detailed circuit diagram of the preferred embodiment of the present invention.

DETAILED DESCRIPTION OF THE INVENTION

Figure 1:
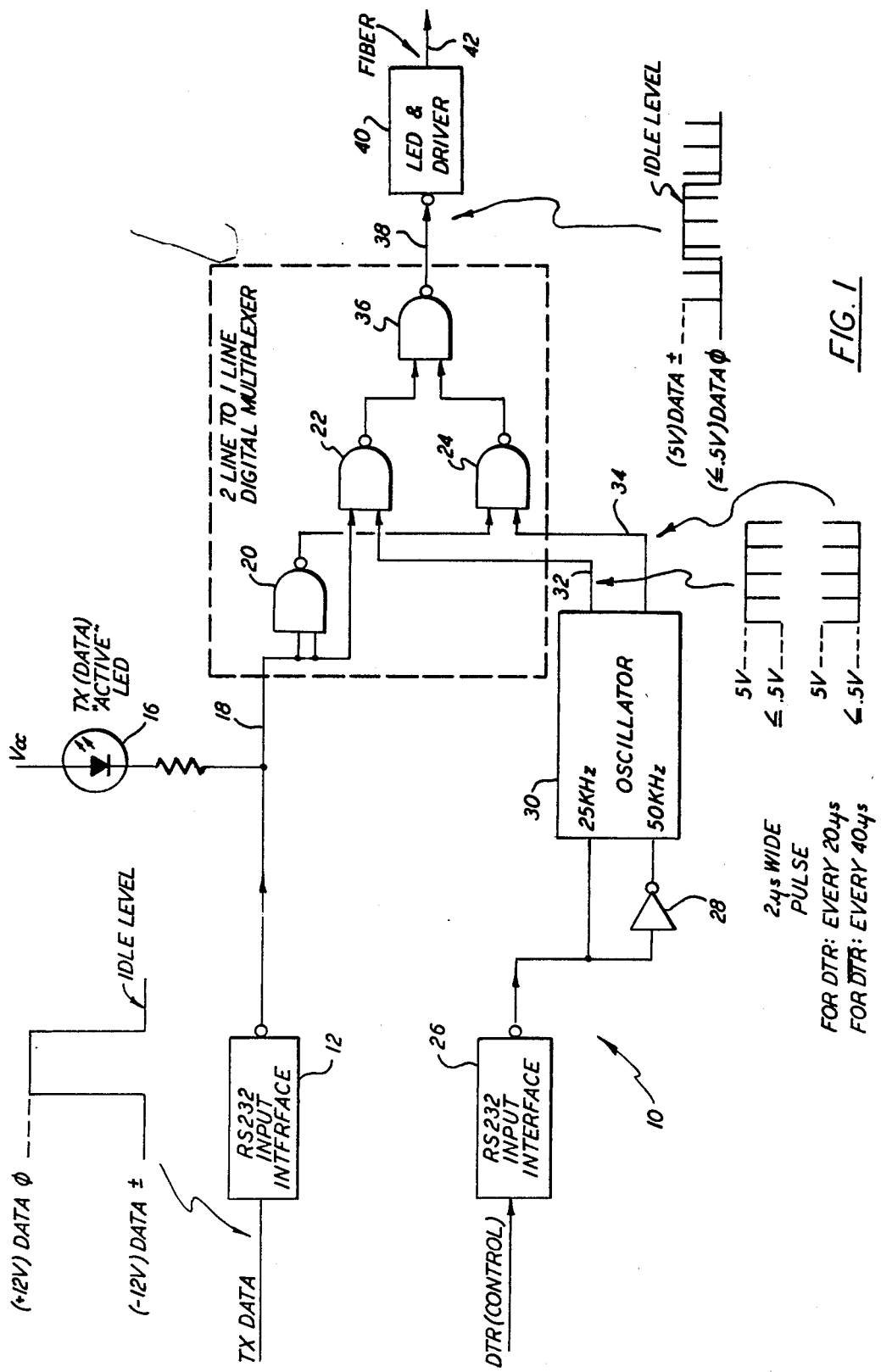
FIG. 1 is a block diagram of a data and control information transmitter designed to operate over a single optical fiber.

Referring first to FIG. 1, the transmitter section 10 of the fiber optic data link of the invention has an input receiver 12 coupled to the TX line 14. For systems according to the present invention, the line 14 carries data which approximates a square wave signal with a typical transition rate of up to about 10 KHz. The data on the TX line is inverted by the receiver 12 and the output voltage is made compatible with other circuits coupled thereto. The input signal to the receiver 12 in the preferred embodiment are typical RS-232 signal which range from $-12$ to $+12$ volts. The receiver 12 inverts the input signals and changes them to TTL compatible signals ranging between 0 and $+5$ volts.

A light emitting diode LED 16 is coupled to the output of the receiver 12 which is turned on when the output of the receiver 12 is active. This occurs when the output of receiver 12 is substantially at 0 volts. The TX data at the output of the receiver 12 is coupled by a line 18 to the input of an inverter 20 and one input to NAND gate 22.

The DTR line of the RS-232 interface is coupled to the receiver 26. The DTR line has a signal on it which remains for long periods of time at one of its two states. When DTR is low, it is inactive, and when it is high, it is active.

The output of the receiver 26 couples to a select gate 28 which couples to an oscillator circuit 30. The oscillator circuit 30 operates either at 25 KHz or 50 KHz depending on the state of the DTR line. When DTR line is inactive (low), the oscillator 30 operates at 25 KHz. However, when DTR is active (high), the oscillator 30 operates at 50 KHz.

The oscillator circuit 30 produces an output on line 32 which is at a level of about $+5$ volts with negative going pulses of about 2 microseconds in duration to a level of about 0.5 volts or less at the frequency of the oscillator, i.e. every 20 microseconds when DTR is active and every 40 microseconds when DTR is inactive. The signal at the oscillator 30 output 34 is the inverse of that on line 32. The output on line 34 is at a level of about 0.5 volts with positive going pulses of about 2 microseconds in duration of about 5 volts. The positive going pulses are at a frequency of the oscillator 30.

The line 32 from the oscillator 30 couples to one input of NAND 22 while the line 34 couples to an input to NAND 24. The output from NAND 22 and the output of NAND 24 each couple to an input to NAND 36. As illustrated in FIG. 1, the gates 20, 22, 24 and 36 are coupled together in the classical manner for a two line to one line digital multiplexer. In this configuration, the output 38 of NAND 36 (the digital multiplexer output) comprises a signal at about $+0.5$ volts or less with 2 microsecond pulses at about $+5$ volts at the frequency of oscillator 30 when the data on line 14 is at the $+12$ volt level (DATA ∅). The output 38 is at $+5$ volts with 2 microsecond pulses of about $+0.5$ volts or less at the frequency of the oscillator 30 when the data on line 14 is at $-12$ volts (DATA 1), the idle level for line 14. The output 38 is at about 0.5 volts or less with 2 microsecond pulses at about 5 volts at the frequency of the oscillator 30.

The output line 38 couples to a driver and LED 40. The driver and LED 40 are coupled to an optical fiber 42 over which the light from the LED is transmitted. The pulse rate of the 2 microsecond light pulses over the fiber 42 indicate the state of the DTR line. When the pulse rate is high (50 KHz), the DTR line is active. When the pulse rate is low (25 KHz), the DTR line is inactive. The state of the light when a pulse is not present corresponds to the state of the data.

Figure 2:
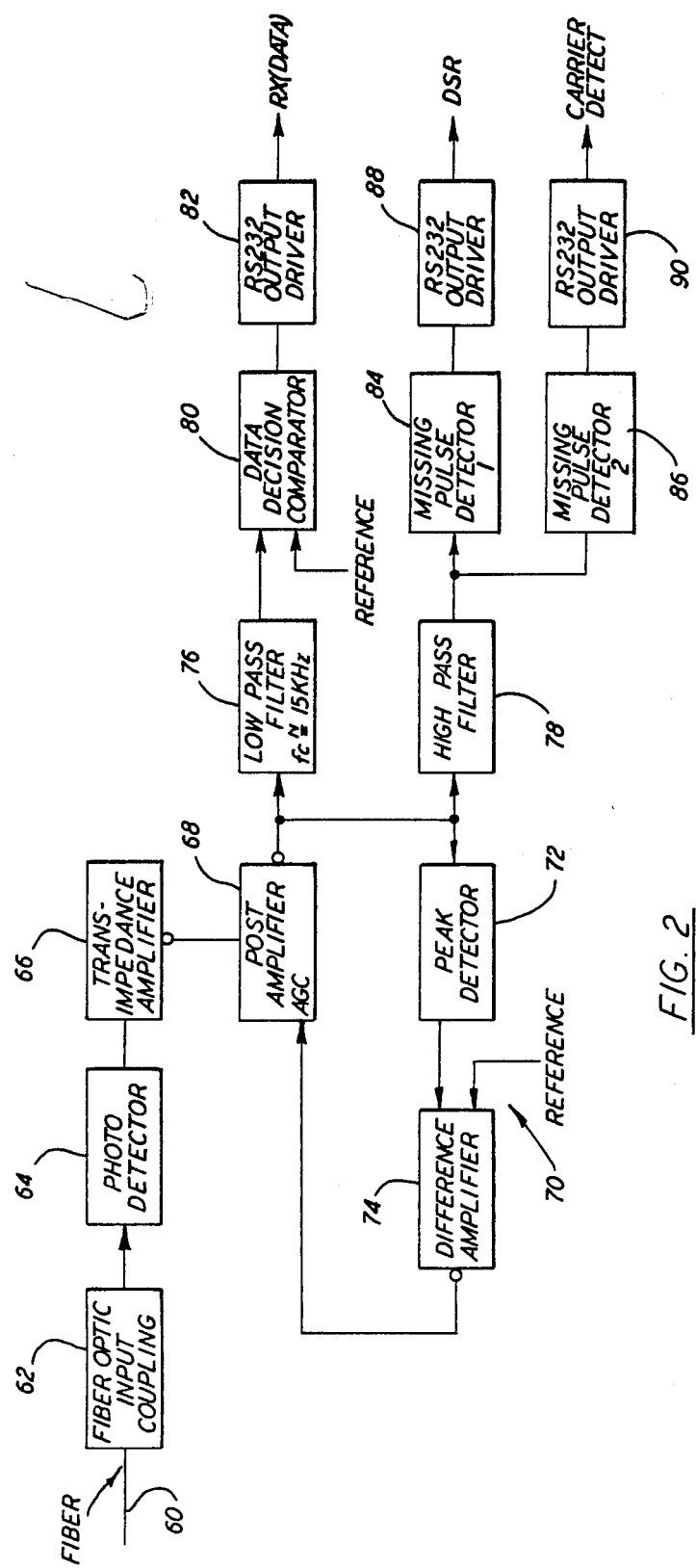
FIG. 2 is a block diagram of a receiver designed to separate the optically encoded data from the control information so produced by a transmitter of FIG. 1.

FIG. 2 schematically illustrates a receiver for receiving the light signal from a transmitter of the type shown in FIG. 1 and converting them into digital signals complying with RS-232 standards. The receiver receives light over the optical fiber 60, which has a suitable coupler 62 to focus the light from the fiber 60 onto the light sensitive surface of a photodetector 64. In the preferred embodiment, the photodetector is preferably a PIN diode. A PIN diode is desirable because it has a good bandwidth, operates at voltages compatible with the remainder of the circuit and is relatively inexpensive.

The output of the photodetector 64 is a very small current mode signal. The photodetector 64 is coupled to a high input impedance trans-impedance amplifier 66 which converts the current mode input signal to an inverted voltage mode output signal. Accordingly, the output of the amplifier 66 comprises a high level signal with negative going 2 microsecond pulses when the transmitted data is a ∅ and a low level signal with positive going 2 microsecond pulses when the transmitted data is a 1. The frequency of the pulses indicates the status of the DTR line at the transmitter.

The trans-impedance amplifier 66 output couples to a post-amplifier 68 which comprises an inverting variable gain amplifier with an automatic gain control (AGC), indicated generally at 70, coupled thereto to control the gain of amplifier 68. The automatic gain control circuit 70 includes a peak detector 72 coupled to the output of the post-amplifier 68. This peak detector 72 detects the positive peaks of the signal output by the post-amplifier 68 and produces an output signal which is related to magnitude of the peak above a reference level.

The peak detector 72 output is coupled to a difference amplifier 74 which compares the peak detector 72 output with a reference. When the output of peak detector 72 is above the reference level, the difference amplifier 74 produces a signal coupled to the AGC input of the amplifier 68 which reduces the gain of the amplifier 68. Conversely, when the output of the peak detector 72 is lower than the reference, the difference amplifier produces a signal coupled to the AGC which increases the gain of amplifier 68. Accordingly, the peak-to-peak voltage at the output of amplifier 68 is maintained at substantially the same level over a wide range of signals at the input thereto.

The post-amplifier 68 output also couples to the input of a low pass filter 76 and a high pass filter 78. The low pass filter 76 is preferably designed with a cutoff frequency of about 15 KHz. As a result, signals at a frequency above 15 KHz are removed by the low pass filter 76 and applied to the input of a data decision comparator 80. Accordingly, the data in the preferred embodiment, which is at a frequency less than 10 KHz, is passed by the low pass filter 76 to a comparator 80. The data decision comparator 80 compares the output of the low pass filter 76 with a reference. When the output of the low pass filter 76 is above the reference, the comparator 80 produces a signal at a given high level (about $+5$ volts for the preferred embodiment). When the low pass filter 76 output is below the reference level, the comparator 80 produces a signal at a given low level (≦0.5 volts for the preferred embodiment).

The data decision comparator 80 is coupled to a line driver 82 which, in the preferred embodiment, is a RS-232 device. The driver 82 converts the input signal which is at either +5 or about 0 volts (TTL level signals) to a signal which is either at −12 or +12 volts (RS-232 compatible levels).

The high pass filter 78 passes frequencies above about 15 KHz in the preferred embodiment so that the pulses included with the data at the amplifier 68 output are separated from the data. The pulse at the output of the filter 78 are then coupled to a first and a second missing pulse detector, 84 and 86 respectively. The first missing pulse detector 84 is designed to produce an indication at its output if a pulse is not received within about 23 microseconds. It will be recalled that when DTR is active, pulses are produced at a rate of about one pulse every 20 microseconds. As such, the first missing pulse detector will not produce a missing pulse indication if DTR is active and the data link is operative between the transmitter and the receiver on opposite ends of an optical fiber.

The second missing pulse detector 86 produces an output in the event a pulse is not received at least every 43 microseconds. When DTR is inactive at the transmitter, pulses are produced every 40 microseconds so the second missing pulse detector 86 will not produce a missing pulse signal. Likewise, if DTR is active, the second missing pulse detector 86 will not produce a missing pulse indication, as pulses will be received at a rate of one every 20 microseconds.

The first missing pulse detector 84 is designed so that when a missing pulse is detected, the missing pulse indication appears at its output and the indication cannot be reset quickly. In fact, the detector 84 cannot be reset if pulses are detected at the proper rate by the second missing pulse detector 86.

The output of the detector 84 is coupled to an RS-232 output driver 88 which drives the DSR line. The DSR line is active when the DTR line at the transmitter has been active for a given period of time required to reset the first missing pulse detector 84. The DSR line goes inactive as soon as the first missing pulse detector 84 detects the fact that a pulse at the 50 KHz rate is missing.

The second missing pulse detector 86 couples to an RS-232 output driver 90, which drives the Carrier Detect Line active when pulses are being received at a rate of at least one every 40 microseconds. When pulses are not received at a rate of at least one every 40 microseconds, the Carrier Detect Line goes inactive, indicating to the device coupled thereto that the link between the transmitter and the receiver is not operational.

Figure 3A:
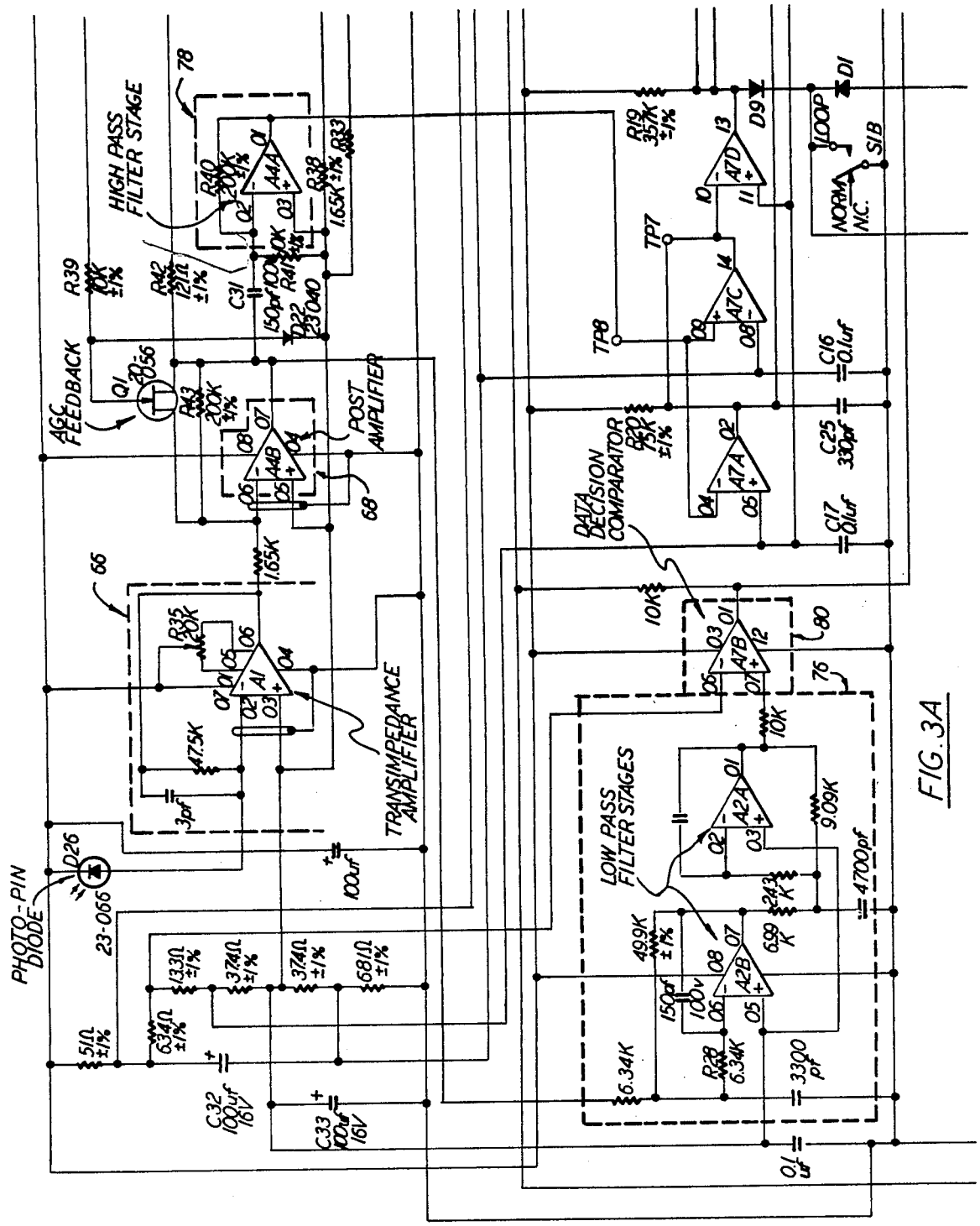

The circuitry shown in FIGS. 3A-3C represent the preferred embodiment of the transmitter and the receiver described above in connection with FIGS. 1 and 2. The circuitry in these drawings is relatively straightforward and its operation is the same as that described with respect to the block diagrams of FIGS. 1 and 2. There are, however, a few areas of the circuit which are not readily apparent as to how they operate and, therefore, a brief description follows of those particular areas.

In FIG. 3A, the receiver section includes a photo-pin diode D26 which is coupled to an operational amplifier A1 which is wired as a transimpedance amplifier 66. The output of the transimpedance amplifier 66 is coupled via a resistor to the inverting input of amplifier A4B, which comprises the post amplifier 68. This post amplifier 68 has an automatic gain control circuit coupled thereto which includes a peak detector 72 and a difference amplifier 74. This automatic gain circuit works in the manner as follows.

When the output voltage from the post amplifier 68 causes the non-inverting input amplifier A5A (FIG. 3C) to go higher than the voltage applied to the inverting input to A5A, the output of amplifier A5A charges capacitor C24. The DC voltage across the capacitor C24 is proportional to the difference between the voltage desired at the output of A4B and the actual voltage appearing at the non-inverting input to A5A. This DC level is then amplified by the amplifier A5B and is applied as a gate control signal to Q1 which in turn controls the feedback resistance between the output and the inverting input of the amplifier A4B. By changing the resistance between the output and the input of A4B, the gain of the post amplifier 68 is changed. In this manner, the output of the post amplifier 68 is dynamically adjustable so that it remains substantially constant over the range of light input detected by the receiver. In this regard, the lowest light level is in the order of 100–150 nanowatts, and the highest is up to about 150 microwatts.

The output of the postamplifier 68, as indicated earlier, couples to the high pass filter 78 and to the low pass filter 76. The path which includes the low pass filter 76 is relatively straightforward. The path which includes the high pass filter 78, however, does operate in a manner sufficiently unusual to warrant some further discussion.

Whenever the input to the high pass filter 78 makes a transition from either a low to a high level state or from a high to a low level state, a pulse is produced at the output of the high pass filter 78 which can be observed with an oscilliscope at test point TP8. The pulse appearing at test point TP8 may be either a positive going or a negative going pulse, depending on the transition occuring at the input to the high pass filter 78. This signal is applied to the first missing pulse detector at the inverting input of amplifier A7A and the non-inverting input of amplifier A7C. The output of these two amplifiers are both coupled to capacitor C25. An oscilliscope looking at test point TP7 can see the voltage appearing across the capacitor C25 which comprises a plurality of triangular pulses with dead time between the pulses. When DTR is inactive, the peak of these pulses is somewhat greater than ½ the supply voltage, or approximately something over six volts. When DTR is active, however, the peak of these pulses will rise to a voltage somewhat less than ½ the supply voltage, or something below six volts. For the circuitry of the drawings, the circuit elements are responsible for the voltage, when DTR is active, having a peak of approximately three volts.

Following the amplifier A7D is a discriminator including amplifier A8 and a capacitor C15 (FIG. 3C). The discriminator circuit is used to determine whether the voltage across the capacitor C15 is above or below the level determined to indicate that DTR is active. When DTR is active, the output of the discriminator A8A goes low, causing the light emitting diode LED1 to turn on. In addition, the low signal is transmitted to both inputs of NAND A6C, thereby causing the output line DSR to go high. DSR high indicates that DTR at the transmitter is active.

When the voltage across capacitor C15 is below that determined to indicate that DTR is active, the output of the discriminator A8A goes high, causing the DSR line to go low and the light emitting diode LED1 to turn off.

It should be noted that the capacitor C15 and the resistor R19 have a relatively long time constant, which is in the order of 35 milliseconds. Accordingly, since pulses occur at a rate of every 40 microseconds when DTR is inactive, it is clear that capacitor C15 never really gets charged to a very high level if DTR is inactive.

The second missing pulse detector includes amplifiers A7A and A7C, as well as the comparator A8B and the amplifier A8D. The amplifier A8B is wired to make a comparison between the voltage level at test point TP7 and the supply voltage coupled to the non-inverting input of A8B. If the pulse voltage appearing at pin 6 of A8B is higher than the voltage at pin 7, the output of A8B acts like a current sink and capacitor C14 discharges. In the event that a pulse is not produced at least once every 40 microseconds, then the output at pin 13 of A8D is kept in a high state, which is inverted by the NAND gate A6B wired as an inverter, thereby driving the carrier detect signal low. When carrier detect is low, the data transmission link between the transmitter and the receiver is not operational.

ACTIVE COMPONENTS OF FIGS. 3A–3C

A1: LF357 (National Semi.)
A4: LF353 (National Semi.)
A5: LF353 (National Semi.)
A2: LF353 (National Semi.)
A7: LM339 (National Semi.)
A8: LM339 (National Semi.)
A9: DS1489 (National Semi.)
A11: 74L504 (T.I.)
A12: 75452 (T.I.)
A6: DS1488 (National Semi.)
A10: LM339 (National Semi.)
A3: LM339 (National Semi.)
D26: SD4478-002 (Spectronics)
D27: SE4352-003 (Spectronics)
All general purpose diodes (P.E. P/N 23-040) are IN4148
D25: IN4607
Q1: J113 (Siliconix)
All LED indicators (P.E. P/N 33-027) are H.P. type 4880
D3: IN751A The remainder of the circuitry in FIGS. 3A–3C is operational in a manner described generally in connection with FIGS. 1 and 2. It will be observed that throughout the drawings that circuit components have been assigned a parameter value or standard commercial designation. This is done purely for clarity and reader convenience and is not intended as a limitation on component value or type, nor as a restriction on the scope of the invention. Indeed, those of skill in the art will readily recognize that changes of circuit components and configurations may be made to the circuitry of the preferred embodiment without departing from the spirit and scope of the present invention defined by the following claims.

What is claimed is:

1. In a single optical fiber data link for transmitting data from a transmitter to a receiver over an optical fiber, the link including:

means to detect light issuing from one end of an optical fiber at two different intensity levels and output a signal at two known levels;

a low pass filter responsive to said output signal to separate square wave signals at a frequency below the cutoff frequency of said low pass filter from said output signal, said separated square wave signal representing the data transmitted over the data link;

a high pass filter responsive to said output signal to separate control pulses at a frequency above the cutoff frequency of said high pass filter from said output signal;

means to determine whether said control pulses are at least at one frequency and to produce a first control signal at one level and to produce said first control signal at a second level if said control pulses occur at a rate below said one frequency; and means to determine whether said control pulses occur at a rate at least at a second frequency less than said one frequency and to produce a second control signal at one level and to produce said second control signal at a second level if said control pulses occur at a rate below said second frequency.

2. The optical fiber data link of claim 1 wherein said means to determine whether said control pulses occur at a rate at least at a second frequency includes a missing pulse detector.

3. The optical fiber data link of claim 1 or 7 additionally including means responsive to an external data source to form light pulses representative of the data from said external data and transmit them through the optical fiber;

means responsive to a control line input to modulate said light pulses at a first frequency higher than the frequency of said external data when said control line is at one level and to modulate said light pulses at a second frequency higher than said first frequency when said control line is at a second level.

4. In a single optical fiber data link, a receiver for receiving a signal in the form of a square wave representing data at one frequency with pulses representing control data superimposed thereon at one of two frequencies higher than said one frequency comprising, in combination:

a photodetector coupled to the optical fiber for producing an output signal proportional to the light intensity striking said photodetector;

an amplifier responsive to said output signal to produce a normalized output signal with levels varying between two known levels;

a low pass filter responsive to said normalized output signal to separate the pulses representing control data from said normalized output signal;

a high pass filter responsive to said normalized output signal to separate the pulses representing control data from said normalized output signal;

means responsive to the output of said low pass filter to produce a square wave data signal varying between known levels representative of the data in the light transmitted over the single optical fiber to said photodetector;

a first missing pulse detector responsive to said high pass filter to produce a first control signal at one level when said pulses output from said high pass filter are at the higher of said two pulse frequencies, and for producing said control signal at a second level for a period greater than that for two pulses at the higher of said two pulse frequencies each time a pulse at the higher of said two pulse frequencies is not detected;

a second missing pulse detector responsive to said high pass filter to produce a second control signal at a first level as long as pulses are detected thereby at a frequency not less than the lower of said two pulse frequencies, and to produce said second control signal at a second level when pulses are detected by said second missing pulse detector at a frequency less than the lower of said two pulse frequencies.

5. The optical fiber data link of claim 4 additionally including means responsive to an external data source to form light pulses representing the data from the external data source and to couple said light pulses to the optical fiber;

means responsive to a control line from the external device indicating whether the device is ready to transmit data to produce pulses at one frequency higher than the data rate from said external data source when said external device is ready to transmit data and to produce pulses at a second frequency below said one frequency and above said data rate when said external device is not ready to transmit data and means to superimpose said pulses at either said one frequency or said second frequency onto said light pulses so that the frequency of the high frequency pulses will indicate whether the external device is ready to transmit data.

6. The optical fiber link of claim 4 or 5 wherein said first missing pulse detector produces said second level for said control signal as soon as one pulse at said higher pulse frequency is determined to be missing and to produce said control signal at said first level only after a plurality of uninterrupted pulses are detected at said higher pulse frequency.

7. In a single optical fiber data link for transmitting data from a transmitter to a receiver over an optical fiber, the data link including:

means to detect light issuing from one end of an optical fiber at two different intensity levels and output a signal at two known levels, each known level corresponding to one intensity level;

a low pass filter responsive to said output signal to separate square wave signals at a frequency below the cutoff frequency of said low pass filter from said output signal, said separated square wave signal representing the data transmitted over the data link;

a high pass filter responsive to said output signal to separate control pulses at a frequency above the cutoff frequency of said high pass filter from said output signal; and means to determine whether said control pulses are at least at one frequency and to produce a first control signal at one level and to produce said first control signal on a second level if said control pulses occur at a rate below said one frequency, said means to determine including a first missing pulse detector responsive to said high pass filter to produce a first control signal at one level when the pulses output by said high pass filter occur at least at said one frequency and said control signal is at a second level whenever said pulses are at a frequency less than said one frequency.

8. The optical fiber data link of claim 7 wherein said means to determine includes a second missing pulse detector responsive to said high pass filter output to produce a second control pulse at one level whenever said pulses are at least at a second frequency lower than said one frequency and at a second level whenever said pulses are at a frequency lower than said second frequency.

* * * * *